Aug. 25, 1964    J. F. HERRMANN    3,145,892
FILM ADVANCING MECHANISM FOR PHOTOGRAPHIC PROJECTORS
Filed Aug. 4, 1961    2 Sheets-Sheet 1
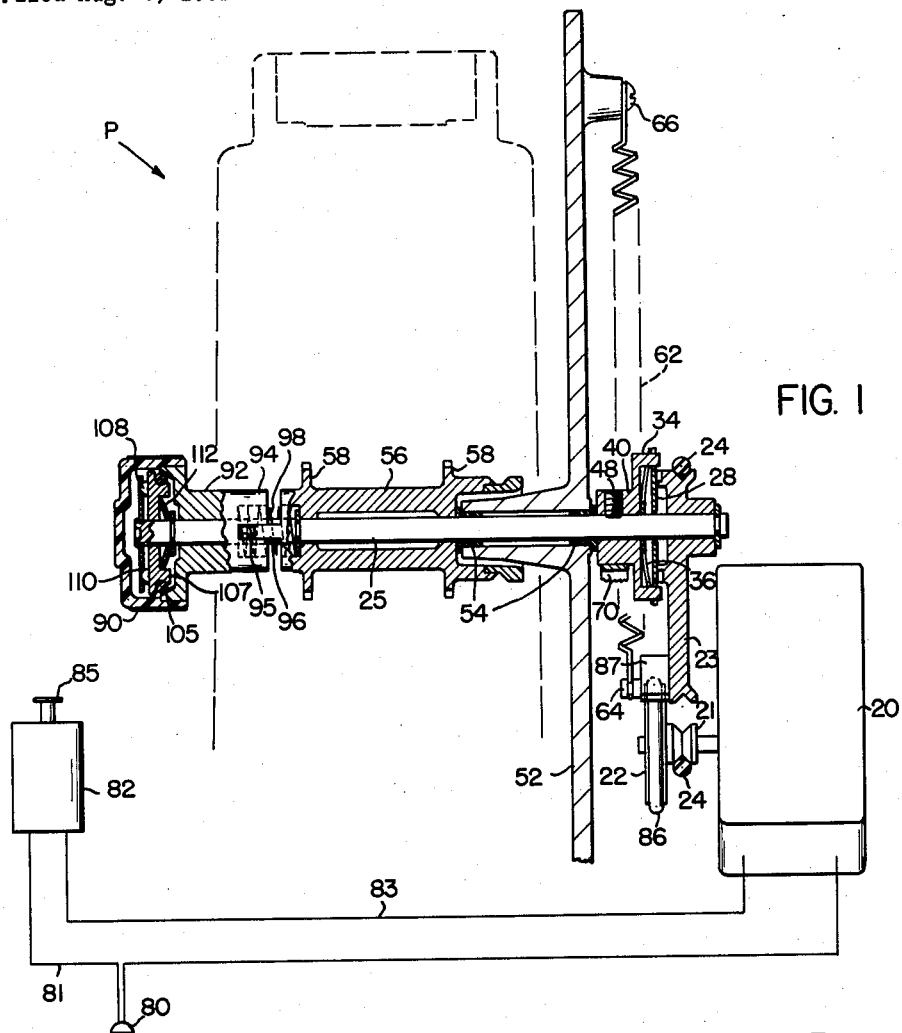
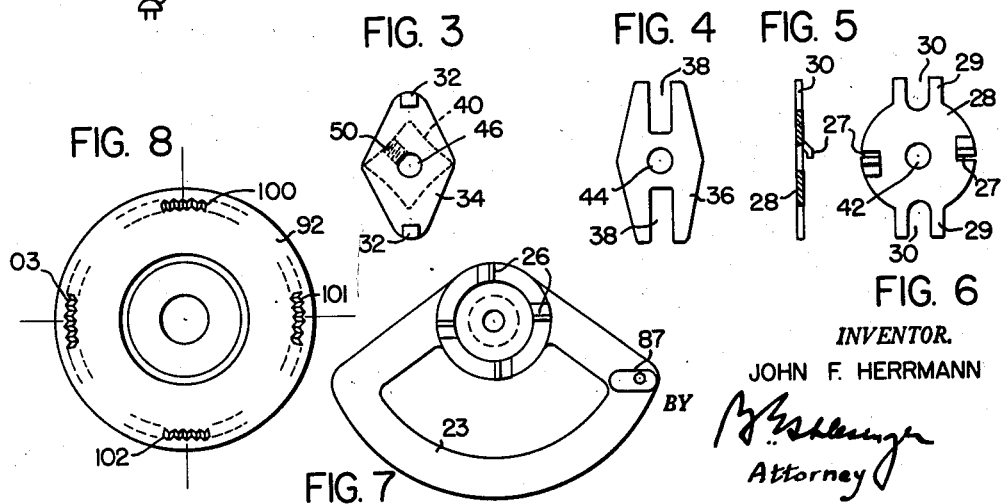
INVENTOR.
JOHN F. HERRMANN
BY
Attorney Aug. 25, 1964   J. F. HERRMANN   3,145,892
FILM ADVANCING MECHANISM FOR PHOTOGRAPHIC PROJECTORS
Filed Aug. 4, 1961   2 Sheets-Sheet 2

*INVENTOR.*
JOHN F. HERRMANN
BY
*Attorney*

United States Patent Office 3,145,892
Patented Aug. 25, 1964

3,145,892
FILM ADVANCING MECHANISM FOR
PHOTOGRAPHIC PROJECTORS
John F. Herrmann, Pittsford, N.Y., assignor to Graflex,
Inc., Rochester, N.Y., a corporation of New York
Filed Aug. 4, 1961, Ser. No. 129,465
7 Claims. (Cl. 226—76)

The present invention relates to projectors for photographic film, and more particularly to still projectors, such as are used in visual and audio-visual educational lectures, advertising talks, etc., where film, instead of slides, is used and where the film is moved intermittently to bring successive frames into projecting position, and the lecturer or salesman talks about the subject matter of a particular frame while that frame is being projected, before he advances the film to bring another frame into projecting position. In a more specific aspect, the invention relates to a power-driven mechanism for intermittently moving the frames of a film into projecting position under control of a remotely operated switch.

Prior projectors of the type described have required two switches, one external or manually-operated for starting the drive motor to advance the film, and the other built into the power circuit and operative to break the power circuit when the external switch is released and a cycle to change the picture (frame) has been completed. On many prior designs, if the lecturer, or the person operating the projector or sound mechanism, inadvertently holds the starting switch too long, the drive motor will continue to run, and the film will continue to advance with the result that it will run beyond the next frame and get out of time with the lecture or sound device. Because of the use of two switches, moreover, somewhat complicated electrical circuitry has heretofore been required.

One object of the present invention is to provide, in a projector of the type described, a mechanism for intermittently advancing film which will insure that only one frame of film can be advanced at a time.

Another object of the invention is to provide, in a projector of the type described, a mechanism for intermittently advancing film with which only one frame of film will be advanced each time the mechanism is actuated, even though the operator of the projector or sound device holds the circuit closed.

Another object of the invention is to provide an intermittent film advancing mechanism for a projector of the type described which will be automatic in operation, simple in construction, reliable, fast, quiet, compact, and economical to build.

Other objects of the invention will be apparent hereinafter from the specification and from the recital of the appended claims, particularly when read in conjunction with the accompanying drawings.

In the drawings:

FIG. 1 is an axial sectional view of an intermittent feed mechanism for a film projector constructed according to one embodiment of this invention, the drawing illustrating, also, somewhat diagrammatically other parts of the projector;

FIG. 3 is a view of a member for connecting the drive sector to the driven shaft;

FIG. 4 is a view of the spring for holding in engagement a pair of face ratchet members, which connect this connecting member with the sector;

FIG. 5 is an axial section through one member of this ratchet pair;

FIG. 6 is a front elevation of this member;

FIG. 7 is a front elevation of the drive sector;

FIG. 8 is an enlarged front elevation of one member of a coupling for connecting the driven shaft to the film drive sprocket;

Figure 9:
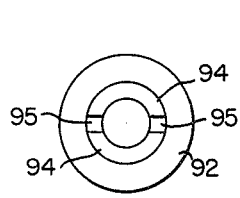
FIG. 9 is a front elevation of another member of this coupling.

In the embodiments of the invention illustrated in the drawings, an electric motor drives a sector in one direction against the resistance of a spring which constantly urges the sector back to its starting position. The sector is connected by face ratchet members with a shaft which, in turn, is connected by a releasable and adjustable coupling with a toothed sprocket which engages and drives the film. When the start switch for the motor is closed, the motor drives the sector in one direction through a predetermined angle sufficient to advance the film, say, by one frame. If the switch is inadvertently held closed, or if the operator of the projector fails to remove his finger from the start button, the motor is stalled and stopped by engagement of a brake shoe on the sector with a member driven by the motor. Thereupon the spring returns the sector to starting position, turning the armature shaft of the now-stopped motor backwards. During the return movement of the sector, the drive shaft is held in the position to which it has been previously advanced, by frictional engagement of a leaf spring with a cam which is secured to the shaft. During the return movement of the sector, the face ratchet permits the required relative movement between the returning sector and the spring-held shaft. Thus, the film is held in its advanced position while the sector is being returned to starting position ready to advance another frame of the film into projecting position.

The coupling, which connects the shaft with the film sprocket, is manually releasable to permit rotating the sprocket relative to the shaft in order to center a frame in the focal plane of the projector.

Referring now to the drawings by numerals of reference and first to the embodiment of the invention illustrated in FIGS. 1 to 9 inclusive, 20 (FIG. 1) denotes the drive motor for the film advancing mechanism. Secured to the armature shaft of this motor are a drive pulley 21 and a brake wheel 22. The drive pulley 21 drives the sector 23 through an elastic belt 24. The sector is rotatably mounted on the shaft 25 of the projector, and is provided on its front side with four equiangularly spaced face clutch teeth 26 (FIG. 7.) The clutch teeth are adapted to be engaged by teeth or lugs 27 (FIG. 6) formed on a pawl plate 28. Pawl plate 28 has forked portions 29 at diametrically opposite sides of its axis. In the slots 30 formed by the furcations 29 there engage lugs or teeth 32 formed integral with a plate 34 (FIG. 3). A leaf spring 36 (FIG. 4) which is slotted at diametrally opposite sides of its axis, as denoted at 38, to align with the slots 30 in the pawl plate 28, and to receive the lugs or teeth 32, is interposed between the opposed faces of the plate 34 and the pawl plate 28. This spring 36 resiliently holds the teeth 27 of the pawl plate 28 in position to engage with the teeth 26 of the segment 23. Each of the four teeth 26 of the sector has a plane side surface at one side which lies in a plane parallel to an axial plane of the sector and an inclined side surface at its other side which is inclined to such an axial plane. Thus teeth 26 constitute face ratchet teeth.

The plate 34 has an approximately square cam member 40 (FIG. 3) formed integral with it. The plate 34, leaf spring 36, and pawl plate 28 have holes 42, 44 and 46, respectively, in them to receive the shaft 25. The plate 34 is secured to this shaft against rotation relative thereto by a setscrew 48 which threads through the hole 50 in the plate and engages the periphery of the shaft. Thus, when sector 23 is driven in one direction it will drive plate 34 through engagement of two teeth 26 of the sector with the two teeth 27 of pawl plate 28; and, through engagement of teeth or lugs 32 of plate 34 in the slots 38 and 30 of spring 36 and of pawl plate 28, the shaft 25 will be driven in one direction with the sector. However, when the sector is rotating in the opposite direction, the teeth 26 will move away from and ratchet over the teeth 27 of spring loaded ratchet plate 28, and sector 28 will revolve backwardly relative to shaft 25 without turning the shaft backward. Thus sector 23 will drive the shaft 25 in one direction only, and on movement of the sector in that one direction only.

Figure 2:
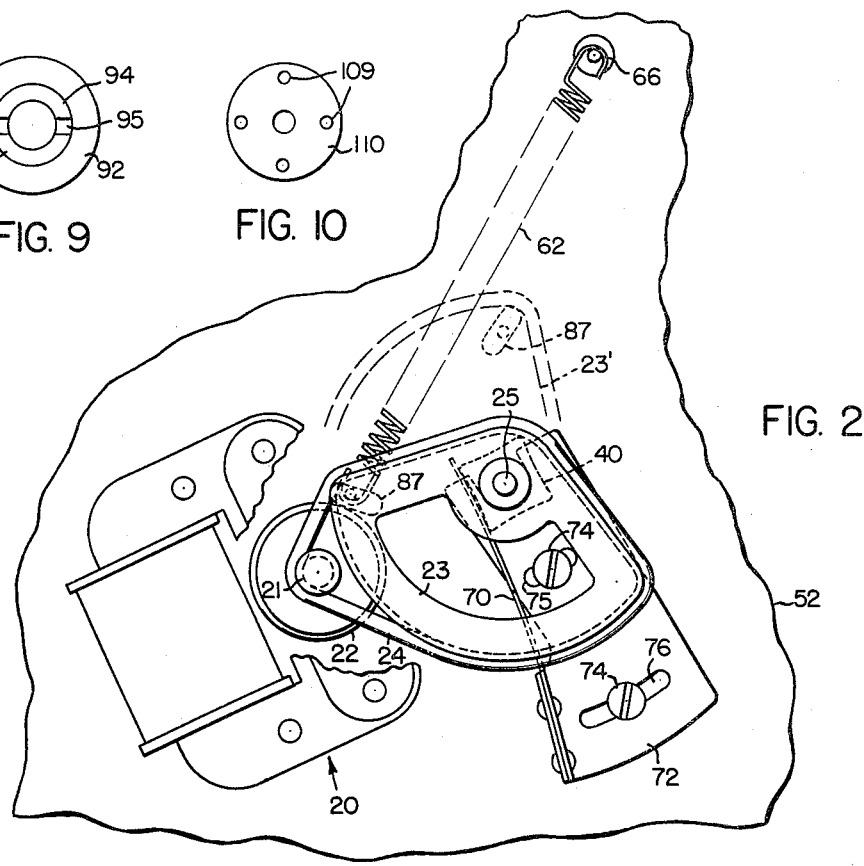
FIG. 2 is a fragmentary view looking at FIG. 1 from the right and further illustrating the construction of this intermittent film advancing mechanism, the drive sector being shown in full and in dotted lines at the two extremities, respectively, of its movement.

A coil spring 62 (FIGS. 1 and 2), which is fastened at one end to a pin 64 that is secured in the sector 23, and which is secured at its other end by means of a screw 66 to the wall 52, serves constantly, however, to urge the sector clockwise about the axis of the shaft 25, as viewed in FIG. 2.

The shaft 25 is journaled in one wall 52 of the projector housing by nylon bushings 54. Journaled on shaft 25 is a conventional film drive sprocket 56, which carries two toothed sprocket portions 58 adapted to engage in perforations along the two edges of the film, which is to be projected, for driving the film.

The shaft 25 is connected to the sprocket 56, to drive the same when the shaft is driven, by a coupling comprising member 92 which is rotatable on shaft 25 and is formed on its rear face with two diametrally disposed recesses 95 (FIG. 9) which are engaged by two elongated teeth which project axially from one end face of film sprocket 56. A coil spring 98 interposed between the block 92 and the sprocket 56 constantly urges the clutch member 92 away from the sprocket but without moving the clutch member far enough to completely disengage recesses 95 from teeth 96. The member 92 is formed with a plurality of sets of internal conical teeth 100, 101, 102 and 103 (FIG. 8), which are adapted to engage a rubber ring 105 (FIG. 1) that is interposed between these teeth and a coupling plate 107. This plate has bosses or protrusions 108 on it which engage in holes 109 (FIG. 10) in a disc or plate 110 that is secured to the shaft 25. Thus, when shaft 25 is driven by sector 23, the film sprocket 56 will be driven from the shaft throuugh disc 110, coupling member 107, rubber ring 105, coupling member 92, and the teeth 96 of the sprocket.

To center a frame of the film in the projector a knob 90 is provided. This knob, which has a knurled periphery, is rigidly secured to coupling member 92. When it is pushed inwardly (from left to right in FIG. 1) against the resistance of spring 98, the coupling member 92 is moved away from rubber ring 105 so that shaft 25 is uncoupled from coupling member 92. By rotating the knob 90 then the sprocket 56 can be turned to center the frame in the film gate without turning the shaft.

A Belleville spring 112 serves constantly to urge the coupling member 107 to a disengaged position to avoid adhesion of ring 105 to coupling member 92.

The several sets of teeth 100, 101, 102 and 103, on the coupling member 92, are slightly shifted angularly relative to one another. For instance, the teeth of the set 100 may be precisely radial to the axis of the member 92, whereas the next set of teeth 101, may be non-radial, or may have the longitudinal center lines of the grooves between the teeth radial and the opposite longitudinal sides of the teeth disposed at opposite sides of the radial center lines. The teeth of sets 100 and 102 may have their tips radial; and the teeth of sets 101 and 103 may have the longitudinal center lines of their interdental grooves radial and their sides straddling said center lines. If all of the sets of teeth were precisely radial, eventually impressions would be made in the rubber ring 105 which would be exactly complementary to the teeth of the coupling member, and which, therefore, would be precisely radial of the axis of the coupling member. By making some of the teeth non-radial, the making of permanent impressions in the rubber ring is avoided, and in effect, an infinite series of adjustments is possible between the ring 105 and the coupling member 92.

When the motor 20 is energized, the sector is driven in a counter-clockwise direction, as viewed in FIG. 2 from the dotted line position denoted at 23' to the full line position shown in that figure, against the resistance of the spring 62. As soon as the motor is stopped, however, the spring 62 will return the sector to the dotted line position 23'. The shaft, however, is held in the indexed position, to which it has been rotated by the motor, by a leaf spring 70 which is riveted to a bracket 72. Bracket 72 is adjustably secured to the wall 52 or some other suitable part of the projector by means of screws 74 which pass through arcuate slots 75 and 76 in the bracket. The slots 75 and 76 are concentric with the axis of the shaft 25.

The motor 20 can be connected to a convenient electrical outlet by a plug 80 (FIG. 1), which is connected through line 81 with a conventional push button switch 82. The push button switch 82 is in turn connected by the line 83 with the motor. When the push button 85 of the switch is pressed in, to close the circuit to the motor 10, the motor will be energized to drive the sector 23 through drive pulley 21 and belt 24 to the full line position shown in FIG. 2. This will cause the shaft 25 to be indexed through one quarter of a turn through engagement of the teeth 27 of the pawl 28 with the ratchet teeth 26 formed on the sector.

To prevent excessive wear on the belt 24 by a not completely stopped motor, and to precisely stop the indexing movement of the sector, a block 87 is provided which is fastened to the sector by the pin 64. It is positioned to engage the wheel 22, which is rubber-tired, as denoted at 86, to stop the movement of the sector when the sector has been indexed through the angle required to advance the film by one frame. Thereby the motor will be stopped by stalling.

As soon as the motor is stopped, the normally open switch 82 will open and the spring 62 will quickly return the sector to the dotted line position of FIG. 2. During the return movement, the armature shaft of the motor will be rotated backward, and the spring 70, by its engagement with one side of the cam 40, will hold the shaft 25 against reverse rotation, thus holding the shaft 20 in indexed position.

The operation of the film-advancing mechanism will be obvious from the preceding description but may be briefly summed up here. When the operator presses switch button 85, the circuit to motor 20 is closed, and the motor drives sector 23 through belt 24 against the resistance of spring 62. The sector drives shaft 25 through engagement of sector teeth 26 with teeth 27 of disc 28, and through the lugs 32 of plate 34, which are in engagement with the slots 30 of the disc 28. The shaft drives the film sprocket 56 through coupling members 110, 107, 105, 92 and coupling teeth 96. The sector swings from the dotted line to the full line position of FIG. 2; and in this swing rotates the film sprocket 56 far enough to advance the film one frame. If the operator fails to remove his finger from the switch button 85, the motor will nevertheless be stopped (stalled) when brake-block 87 engages rubber-tired disc 22. When the switch button is released, spring 62 will return sector 23 to its starting position, turning the armature shaft of the motor backwards. In this return movement the teeth 26 of the sector will ratchet idly over the teeth 27 of the disc 28; but the shaft 25 will be held in the position, to which it has been advanced by engagement of spring 70 with one side of the four-sided cam 40. If it is necessary to center the frame in the light beam of the projector, knob 90 is pushed in to disengage the coupling member 92 from ring 105, and is rotated.

With the film advance mechanism described, only a small number of motor revolutions is required to drive the sector 23 the distance required to advance the film strip a frame. The sector stop shoe 87 prevents belt wear by stalling the motor. The turning of the motor backward on the return stroke of the sector saves a slip clutch.

Figure 10:
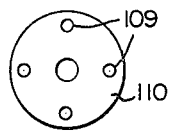
FIG. 10 is a front elevation of another member of this coupling.
Figures 11, 12:
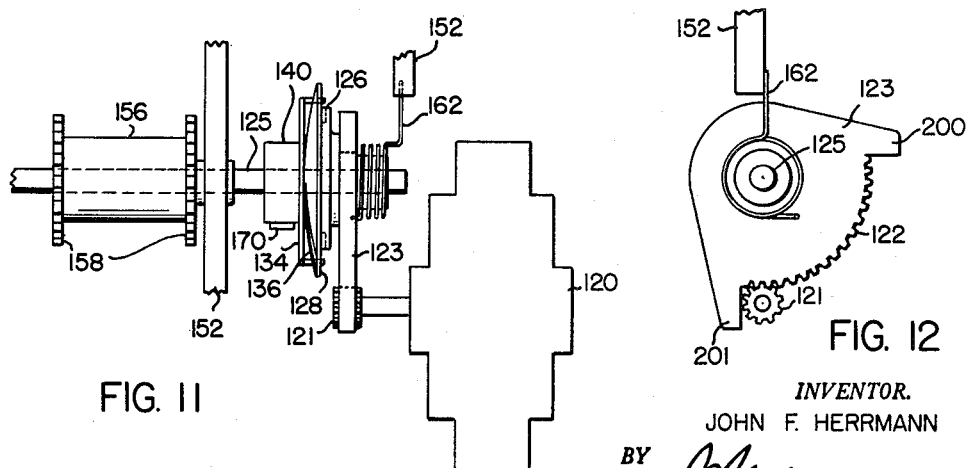
FIG. 11 is a fragmentary view, similar to FIG. 1, illustrating another embodiment of the invention.
FIG. 12 is a fragmentary side elevation illustrating the drive sector of this embodiment.

The embodiment of the invention, which is illustrated in FIGS. 10 and 11, is similar to that already described. Here, however, the motor, denoted at 120, drives a pinion 121 which meshes with the teeth 122 of a sector 123. Sector 123 is rotatable on shaft 125 and is coupled to that shaft by face ratchet teeth 126, similar to teeth 26 (FIG. 7), which are engaged by teeth or lugs formed on a pawl plate 128, that is similar to pawl plate 28 (FIGS. 5 and 6). Pawl plate 128 has forked portions, like plate 28, which are engaged by lugs or teeth projecting axially from plate 34, like the teeth 32 (FIG. 3). A spring 136, like spring 36 (FIG. 4), is interposed between plates 134 and 128. Plate 134 has a square cam 140 formed integral with it, like cam 40, and engaged by a leaf spring 170, similar to spring 70 and operating like spring 70. Cam 140 is secured to shaft 125; and shaft 125 drives film sprocket 156 through coupling members like coupling members 110, 107, 105, 92 of FIG. 1.

As shown in FIG. 12, the sector has stop lugs 200, 201 integral with it which stop it after rotation through the required angle in either direction. The motor 120 is energized through a button 82 and electrical circuit such as shown in FIG. 1. When it reaches the end of its driving stroke it is stalled by engagement of lug 200 with the shaft of pinion 121. A coil spring 162, one end of which is connected to the sector 123 and the other end of which is connected to a fixed wall 152 of the projector, serves to turn the motor in reverse when the motor is stopped at the end of the driving stroke of the sector.

While the present invention has been described in connection with a photographic projector, there are certain features of the invention which have wider application. For instance, the motor-driven sector, brake block and wheel may be used in a rotary type electric switch system. This mechanism produces a rotational movement, once it is started, which has a relatively uniform torque, as contrasted, for example, with a rotary solenoid. Furthermore, this mechanism with the ratcheting mechanism, including the cam and leaf-spring detent, may be used, for example, in a counter. Still further, the coupling comprising a plastic ring, such as ring 105, and a toothed face member, such as member 92, having differently disposed sets of teeth, such as 100, 101, 102 and 103, has wide use.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Film advancing mechanism for driving a film strip one frame at a time through the gate of a photographic projector comprising an electric motor, means for closing an electric circuit to said motor, a reciprocatory member, a rotary film sprocket for engaging and feeding film, means including a ratchet and pawl mechanism for rotating said sprocket on each stroke of said member in one direction to advance said sprocket step-by-step upon successive movements of said member in said one direction, means connecting said motor to said member to move said member in said one direction when an electric circuit is closed to said motor, spring means connected to said member to urge said member constantly in the opposite direction to return said member to its starting position and to turn said motor backwards, an element connected to said motor to be driven thereby during operation of said motor, and means carried by said member and operative at the limit of movement of said member in said one direction to engage said element to stop rotation of the same and to stall said motor.

2. Film advancing mechanism as claimed in claim 1, wherein said reciprocatory member is an oscillatory sector, said sector is rotatably mounted on a driven shaft and is connected by said ratchet and pawl mechanism with said driven shaft to drive said shaft intermittently in one direction on movement of said sector in said one direction, and said driven shaft is connected by coupling means to said film sprocket to rotate said film sprocket when said shaft is driven in said one direction.

3. Film advancing mechanism for driving a film strip one frame at a time through the gate of a photographic projector, comprising an electric motor, switch means for closing an electric circuit to said motor to operate said motor, a shaft, a film sprocket rotatably mounted on said shaft, means for releasably coupling said firm sprocket to said shaft to transmit the motion of said shaft to said sprocket when said sprocket is coupled to said shaft, a sector rotatably mounted on said shaft, a ratchet and pawl mechanism connecting said sector to said shaft to transmit the motion of said sector to said shaft when the said sector is moved in one direction, means for driving said sector from said motor in said one direction when said switch means closes the circuit to said motor, a rotary member connected to said motor to be driven thereby when said motor is operated, a brake member carried by said sector and positioned to engage said rotary member and stall and stop said motor when said sector has been rotated in said one direction through a predetermined angle, means for returning said sector to starting position after said motor has been stopped, and means for retaining said shaft in the position, to which it has been advanced by said sector, during the return movement of said sector.

4. Film advancing mechanism as claimed in claim 3 in which said retaining mechanism comprises a four sided cam, and a leaf spring positioned to engage the sides of said cam successively as said sector is intermittenly rotated by said motor, and said motor rotates said sector through an angle of ninety degrees each time said motor is operated.

5. Film advancing mechanism as claimed in claim 3 in which said releasable coupling means comprises a first coupling member rotatably and axially movable on said shaft, a second coupling member secured to said film sprocket, one of said coupling members having face clutch teeth and the other of said coupling members having confronting recesses in which said teeth engage, a spring interposed between said coupling members and adapted to urge them constantly apart, said teeth being of sufficient axial length however to maintain engagement with said confronting recesses in all positions of said coupling members, and the resistance of said springs, said last-named coupling member to said shaft, the last-named coupling means being disengageable by axial movement of said first coupling member toward said second coupling member against the resistance of said spring, said last-named coupling means comprising a resilient ring secured to said shaft, and a toothed member secured to said first coupling member to engage said ring under pressure of said spring, said toothed member having a plurality of sets of angularly spaced teeth for engaging said ring to transmit torque between said ring and said first coupling member, teeth of different sets of said plurality of sets of teeth being differently inclined longitudinally to the axis of said shaft.

6. A mechanism comprising an electric motor, an oscillatable member, a belt and pulley drive connecting the armature shaft of said motor to said member to drive said member in one direction upon rotation of said shaft in one direction, a switch adapted to be operated to connect said motor to a source of electrical power to effect rotation of said shaft in its said one direction, a wheel secured to the armature shaft of said motor, a brake block carried by said member and positioned thereon to engage said wheel to stop said motor after said member has traveled a predetermined distance in its said one direction, and spring means connected to said member for rotating said member and said shaft back to their respective starting positions upon release of said switch.

7. An intermittent drive comprising an electric motor, an oscillatable first member, means connected to the armature shaft of said motor for driving said first member in one direction upon rotation of said shaft in one direction, a switch for connecting said motor to a source of electrical power to effect rotation of said shaft in its said one direction, means connected to said first member to stop said motor after said first member has traveled a predetermined distance in its said one direction, means for rotating said first member and said shaft back to their respective starting positions upon stoppage of said motor, a second member, a ratchet mechanism connecting said first member to said second member to advance said second member step-by-step with the periodic movements of said first member in its said one direction, and means for retaining said second member in the position to which it is advanced upon each rotation of said first member in its said one direction, said stopping means comprising a wheel secured to said shaft, and a brake block carried by said first member and positioned to engage said wheel after said first member has traveled said predetermined distance in said one direction.

References Cited in the file of this patent
UNITED STATES PATENTS

| | | |
|---|---|---|
| 1,745,481 | Gilmore | Feb. 4, 1930 |
| 2,067,835 | Erwood | Jan. 12, 1937 |
| 2,425,704 | Nemeth | Aug. 12, 1947 |
| 2,571,795 | Tyler et al. | Oct. 16, 1951 |
| 2,644,562 | Pettus | July 7, 1953 |
| 2,670,246 | Kelleigh | Sept. 28, 1954 |
| 2,819,071 | Dietz et al. | Jan. 7, 1958 |

FOREIGN PATENTS

| | | |
|---|---|---|
| 603,724 | Great Britain | June 22, 1948 |